Patented May 14, 1935

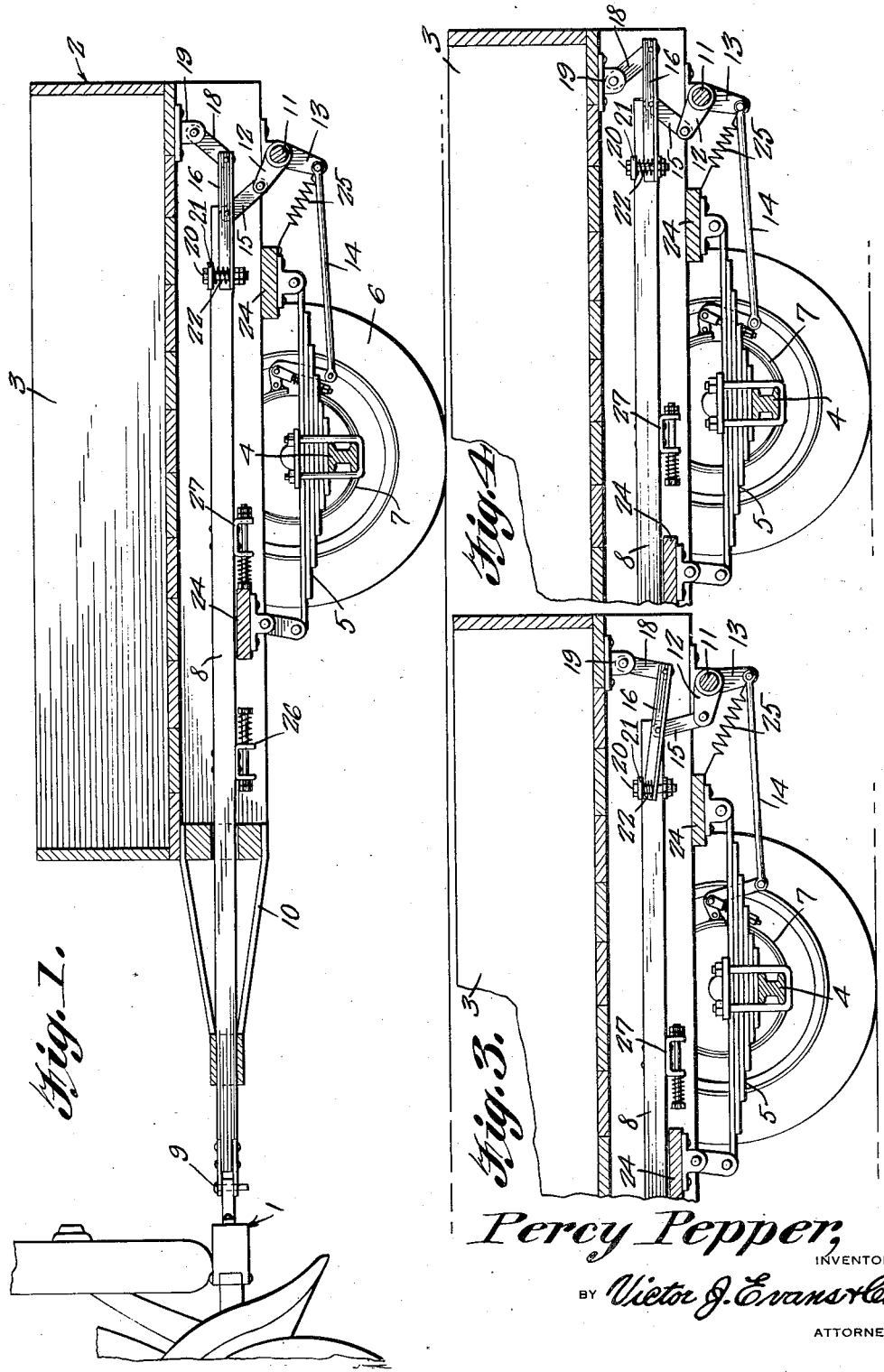

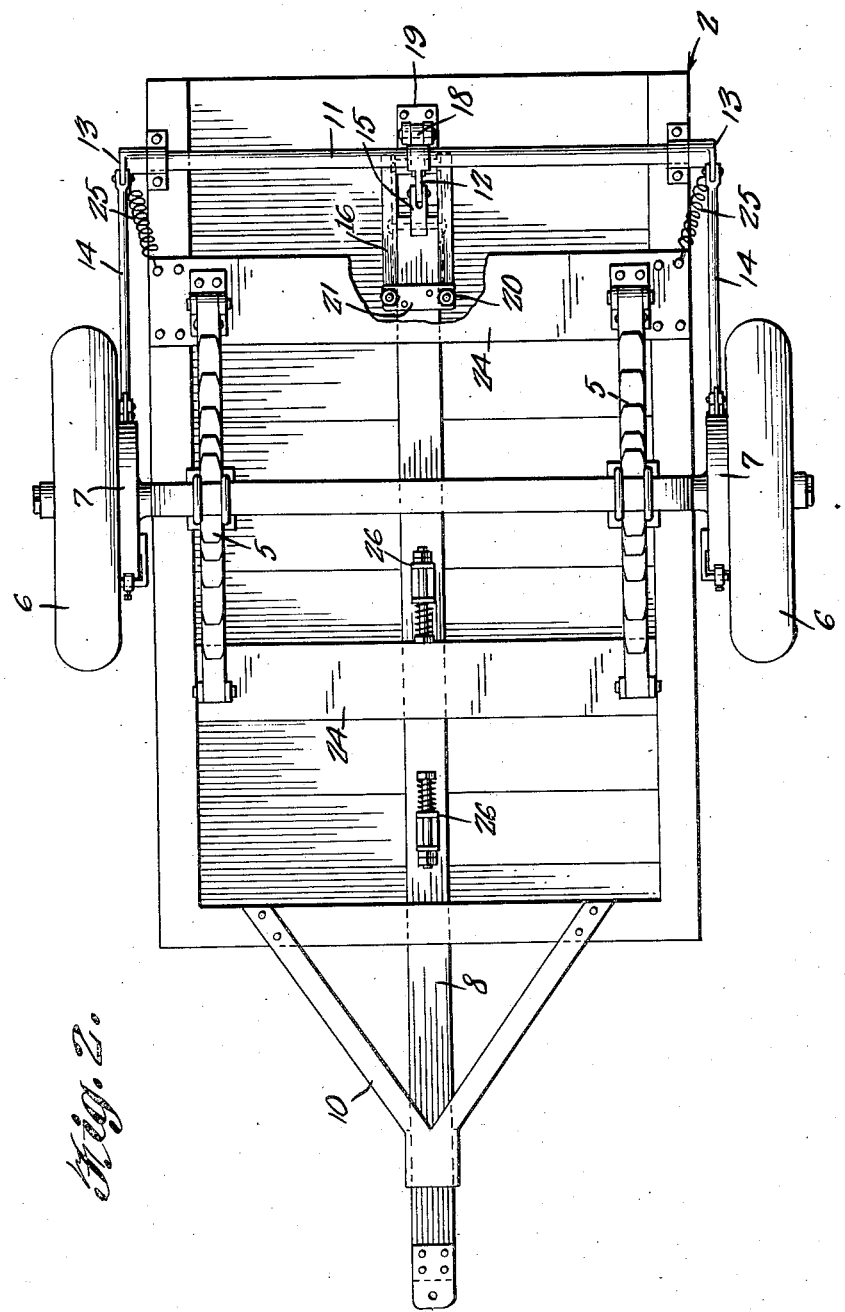

2,001,630

UNITED STATES PATENT OFFICE 2,001,630

BRAKE

Percy Pepper, Fort Wayne, Ind.

Application May 1, 1934, Serial No. 723,383

2 Claims. (Cl. 188—112)

This invention relates to brakes for trailers of motor vehicles and more particularly for operating mechanism for the wheel brakes of the trailer, and has for the primary object the provision of a mechanism of the above stated character which will automatically apply and release the brakes of the trailer by the latter's increase and decrease of speed of travel relative to the motor vehicle and also automatically release the brakes of said trailer during the backing of the latter by the motor vehicle, consequently relieving the brakes of the motor vehicle of the burden of retarding the speed of travel of the trailer during the slowing down or stopping of the motor vehicle and obviates brake connections between the motor vehicle and the trailer and the necessity of brake adjustments under load variances of the trailer.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a trailer connected to a fragmentary portion of a motor vehicle and equipped with a brake operating mechanism constructed in accordance with my invention.

Figure 2 is a bottom plan view illustrating a trailer and showing the brake operating mechanism applied thereto.

Figure 3 is a fragmentary vertical sectional view showing the brakes of the trailer in applied position by the brake operating mechanism.

Figure 4 is a similar view showing the brakes of the trailer in released position by said brake operating mechanism during backing of the trailer by the motor vehicle.

Referring in detail to the drawings, the numeral 1 indicates a fragmentary portion of a motor vehicle to which is connected a trailer 2 of the two-wheel type and including the body 3 supported to an axle 4 by springs 5, the axle 4 having the usual ground wheels 6 journaled thereto and equipped with brakes 7 of the conventional type found in motor vehicle construction. A draft tongue 8 is mounted to the body 3 of the trailer for a limited sliding movement in either direction and at the forward end is provided with a suitable coupling 9 for connecting the tongue to the motor vehicle 1. A guide 10 applied to the forward end of the body 3 aids in supporting the tongue for a limited sliding movement relative to the body.

A brake operating shaft 11 is journaled to the body 3 of the trailer and is equipped with angularly related arms 12 and 13. The arms 13 are connected to the brakes 7 by brake rods 14. The arm 12 is pivotally connected to a link 15 which is in turn pivotally connected to operating members 16. The rear ends of the operating members 16 are pivoted to a link 18 and the latter is pivoted to a bracket 19 carried by the body 3. The link 18 forms a movable fulcrum for the operating members 16 and the latter are slotted to slidably receive bolts 20 carried by a plate 21 secured to the upper face of the tongue 8. Interposed between the plate 21 and the operating members 16 and mounted upon the bolts are coil springs 22.

The trailer when under towing action by the motor vehicle 1, the brakes 7 are in released position, as shown in Figure 1; with the operating members 16 paralleling the tongue 8 and the link 18 assuming a position forwardly and downwardly with respect to the bracket 19. The arm 12 and link 15 extend forwardly and upwardly with respect to the shaft 11 while the arms 13 assume a downward and forward position relative to the shaft 11. Spring hangers 24 are employed between the springs 5 and the body 3 and the spring hangers 24 which are arranged forwardly and rearwardly of the axle 4 have connected thereto coil springs 25 that are in turn connected to the arms 13. The action of the springs 25 is to position the parts for the release of the brakes 7. However, the brakes 7 are of the self-releasing type when braking force is released thereto, consequently the springs 25 are employed only as mediums to assure the release of the brakes 7 when relieved of braking force.

The front spring hangers 24 form an abutment for cushioning devices 26 and 27 carried by the tongue 8. The cushioning devices 26 and 27 absorb sudden forces due to the quick starting forward or backward of the motor vehicle preventing shock from reaching the body of the trailer.

In operation, during the slowing down or stopping of the motor vehicle, the momentum of the trailer causes the body and tongue to move relative to each other and the various arms and links heretofore described to assume the position as shown in Figure 3, applying the brakes 7 to the wheels of the trailer. A lag of the trailer relative to the motor vehicle causes the parts to assume the positions shown in Figure 1 and thereby release the brakes. A positive backing force of the motor vehicle to the trailer will cause the parts to assume a position as shown in Figure 4, that is, the link 15 swings rearwardly of a vertical position permitting the arms 13 to remain in non-brake applying position and consequently the brakes 7 remain in released position so that the trailer may be successfully backed by the motor vehicle.

Having described the invention, I claim:

1. In combination with a trailer having ground wheels provided with brakes, a draft tongue mounted to the trailer for a limited sliding movement relative thereto, means for connecting the tongue to a motor vehicle, a shaft journaled to the trailer, depending arms integral with the shaft, means connecting the arms to the brakes, an arm integral with the shaft and arranged angularly to the first-named arms, and an operating mechanism between the tongue and the second-named arm and connected to the trailer for automatically applying and releasing the brakes during the increase or decrease of speed of travel of the trailer relative to the motor vehicle, and to maintain the brakes in released position during the backing of the trailer by said motor vehicle.

2. In combination with a trailer having ground wheels provided with brakes, a draft tongue mounted to the trailer for a limited sliding movement relative thereto, means for connecting the tongue to a motor vehicle, a shaft journaled to the trailer, depending arms integral with the shaft, means connecting the arms to the brakes, an arm integral with the shaft and arranged angularly to the first-named arms, a pivotally mounted fulcrum carried by the trailer, operating members pivoted to said fulcrum and pivotally and slidably connected to the tongue, and a link pivoted to said members and to the second-named arm whereby the brakes will be automatically applied and released during the increase and decrease of speed of travel of the trailer relative to the motor vehicle and to maintain the brakes in released position during the backing of the trailer by said motor vehicle.

PERCY PEPPER.